United States Patent
Byun et al.

(10) Patent No.: US 12,068,490 B2
(45) Date of Patent: Aug. 20, 2024

(54) POUCH-TYPE SECONDARY BATTERY AND METHOD FOR MANUFACTURING THE SAME

(71) Applicant: SK ON CO., LTD., Seoul (KR)

(72) Inventors: Jae Gyu Byun, Daejeon (KR); Dong Ju Kim, Daejeon (KR); Sang Mo Kim, Daejeon (KR); Jin Go Kim, Daejeon (KR); Sun Min Park, Daejeon (KR); Taek Eon Jeong, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/868,603

(22) Filed: Jul. 19, 2022

(65) Prior Publication Data

US 2023/0017233 A1    Jan. 19, 2023

(30) Foreign Application Priority Data

Jul. 19, 2021  (KR) .................. 10-2021-0094464
Jan. 21, 2022  (KR) .................. 10-2022-0009245

(51) Int. Cl.
*H01M 50/184* (2021.01)
*H01M 10/04* (2006.01)
(Continued)

(52) U.S. Cl.
CPC ..... *H01M 50/184* (2021.01); *H01M 10/0481* (2013.01); *H01M 10/049* (2013.01);
(Continued)

(58) Field of Classification Search
CPC .. H01M 50/30; H01M 50/184; H01M 50/178; H01M 50/105; H01M 50/10
See application file for complete search history.

(56) References Cited

U.S. PATENT DOCUMENTS

2016/0351865 A1* 12/2016 Ottomano ............... B32B 27/32
2018/0219245 A1    8/2018 Choi et al.
(Continued)

FOREIGN PATENT DOCUMENTS

EP          3799180 A2    3/2021
KR   10-2017-0052061 A    5/2017
(Continued)

OTHER PUBLICATIONS

European Search Report for EP Patent Application No. 22185850.9, dated Dec. 16, 2022, 9 pages.

*Primary Examiner* — Kenneth J Douyette
(74) *Attorney, Agent, or Firm* — Perkins Coie LLP

(57) ABSTRACT

A pouch-type secondary battery includes an electrode assembly including a first electrode plate, a separator, and a second electrode plate; and a pouch film in which the electrode assembly is accommodated, wherein the pouch film includes a first side sealing portion from which a negative electrode lead connected to the electrode assembly protrudes, a second side sealing portion from which a positive electrode lead connected to the electrode assembly protrudes, and an upper sealing portion having both end portions connected to the first and second side sealing portions, and the pouch film includes a folded portion disposed on an end of the first side sealing portion and an end of the second side sealing portion, and folded toward a bottom portion of the pouch film, wherein the folded portion is folded in one direction.

5 Claims, 7 Drawing Sheets

(51) Int. Cl.
*H01M 50/105* (2021.01)
*H01M 50/178* (2021.01)
*H01M 10/60* (2014.01)

(52) U.S. Cl.
CPC ....... *H01M 50/105* (2021.01); *H01M 50/178* (2021.01); *H01M 10/60* (2015.04)

(56) References Cited

U.S. PATENT DOCUMENTS

2020/0203687 A1 6/2020 Kim et al.
2020/0343575 A1 10/2020 Kim et al.
2020/0365836 A1 11/2020 Jung et al.
2021/0098753 A1 4/2021 Kang et al.

FOREIGN PATENT DOCUMENTS

KR 10-2019-0010434 A 1/2019
KR 10-2021-0038230 A 4/2021
WO 2019123910 A1 6/2019

\* cited by examiner

POUCH-TYPE SECONDARY BATTERY AND METHOD FOR MANUFACTURING THE SAME

CROSS-REFERENCE TO RELATED APPLICATION(S)

This application claims benefit of priority to Korean Patent Application Nos. 10-2021-0094464 and 10-2022-0009245 respectively filed on Jul. 19, 2021 and Jan. 21, 2022 in the Korean Intellectual Property Office, the disclosures of which are incorporated herein by reference in their entirety.

TECHNICAL FIELD

The present disclosure relates to a pouch-type secondary battery and a method for manufacturing the same.

A pouch-type secondary battery may be classified as a unidirectional pouch-type secondary battery or a bidirectional pouch-type secondary battery, according to directivity of an electrode lead, and may be classified as a three-side sealed pouch-type secondary battery or a four-side sealed pouch-type secondary battery, according to the number of sealing surfaces thereof.

Meanwhile, in the three-side sealed pouch-type secondary battery, both ends of a non-sealing surface may protrude, an arrangement which may be generally known by various names such as a shark-fin, a bat ear, or the like.

Meanwhile, a plurality of pouch-type secondary batteries may be accommodated in a case or the like to be manufactured as a secondary battery module and a secondary battery pack.

However, when the secondary battery module or the secondary battery pack is manufactured, due to the above-described protrusion, there may be problems in that a volume density thereof may be lowered, and, furthermore, cooling efficiency thereof may be lowered.

SUMMARY

An aspect of the present disclosure is to provide a pouch-type secondary battery in which a protrusion is removed or a height thereof is reduced, and a method of manufacturing the same.

In addition, an aspect of the present disclosure is to provide a pouch-type secondary battery improving bulk density and increasing cooling efficiency, and a method for manufacturing the same.

According to an aspect of the present disclosure, a pouch-type secondary battery includes an electrode assembly including a first electrode plate, a separator, and a second electrode plate; and a pouch film in which the electrode assembly is accommodated, wherein the pouch film includes a first side sealing portion from which a negative electrode lead connected to the electrode assembly protrudes, a second side sealing portion from which a positive electrode lead connected to the electrode assembly protrudes, and an upper sealing portion having both end portions connected to the first and second side sealing portions, and the pouch film includes a folded portion disposed on an end of the first side sealing portion and an end of the second side sealing portion, and folded toward a bottom portion of the pouch film, wherein the folded portion is folded in one direction.

The folded portion may include a pressed portion having a folded shape on an end thereof connected to the bottom portion.

The pouch film may include sealing portions on three sides of the pouch film.

A portion of the folded portion to be folded may have a straight shape.

The pouch film may be folded from and overlapped on both sides based on one side surface of the electrode assembly, and a portion of the pouch film contacting the one side surface of the electrode assembly may form the bottom portion.

A portion of the folded portion to be folded may be disposed in a central portion of the bottom portion of the pouch film.

According to another aspect of the present disclosure, a method for manufacturing a pouch-type secondary battery, includes folding a pouch film to accommodate an electrode assembly in the pouch film; forming a first side sealing portion, a second side sealing portion, and an upper sealing portion in both end portions and an upper portion of the pouch film; and forming a folded portion by pressing a protrusion disposed on ends of the first and second side sealing portions, wherein the folded portion is formed by folding the protrusion in one direction toward a bottom portion of the pouch film.

In the forming a folded portion, the protrusion may be folded by rolling of a roller, to form the folded portion.

The roller may be disposed and rolled inclinedly with respect to the bottom portion of the pouch film.

The folded portion may include a pressed portion having a folded shape on an end thereof connected to the bottom portion.

The folded portion may be formed by folding the protrusion with a plate-shaped folding knife.

The forming a folded portion may include heating or cooling the protrusion.

A portion of the folded portion to be folded may have a straight shape.

The folded portion may be formed by folding the protrusion on a folded portion forming plate, wherein at least one of heating and cooling the folded portion forming plate may be performed.

The folded portion may be formed by rotating the bottom portion of the pouch film to be in close contact with the folded portion forming plate.

A portion of the folded portion to be folded may have a straight shape.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
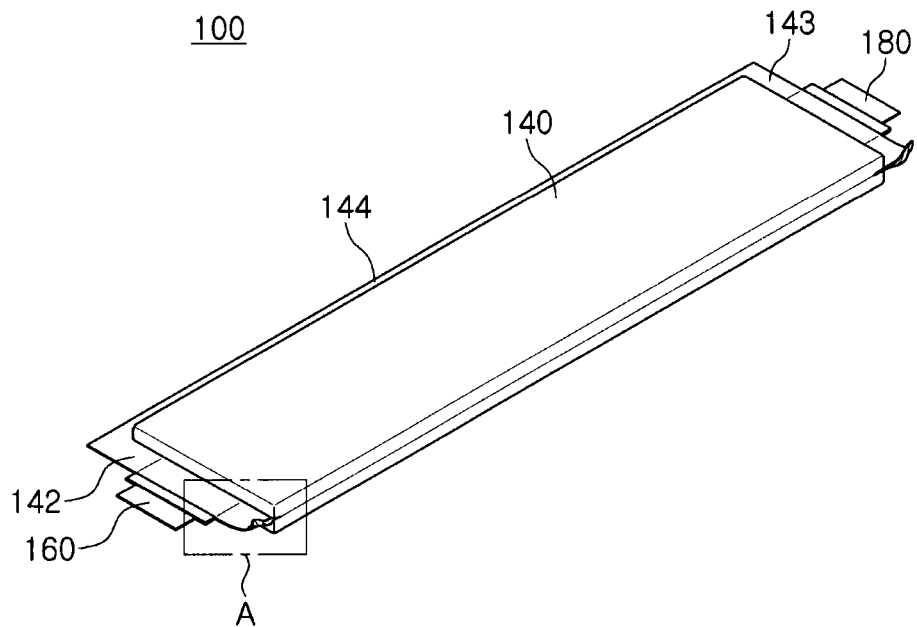
FIG. 1 is a perspective view illustrating a pouch-type secondary battery according to an embodiment of the present disclosure.

Hereinafter, embodiments of the present disclosure will be described with reference to specific embodiments and the accompanying drawings. However, the embodiments of the present disclosure can be modified to have various other forms, and the scope of the present disclosure is not limited to the embodiments described below. Furthermore, the embodiments of the present disclosure are provided to more fully describe the present disclosure to those skilled in the art. Therefore, the shapes and sizes of the elements in the drawings may be exaggerated for clarity of description, and the elements denoted by the same reference numerals in the drawings are the same elements.

Figure 2:
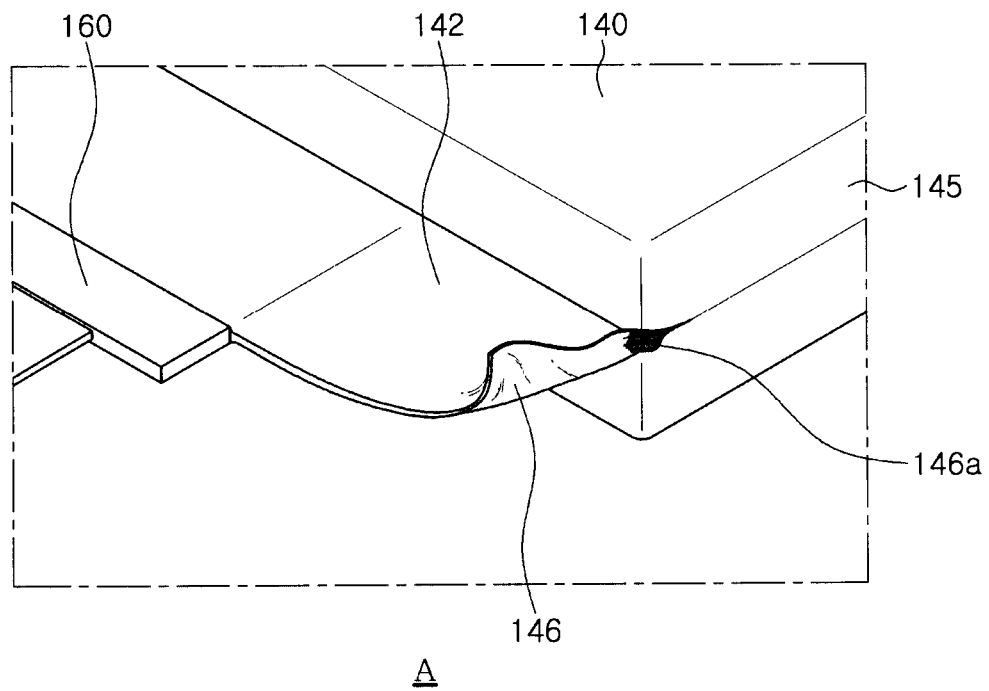
FIG. 2 is an enlarged view illustrating portion A of FIG. 1.
Figure 3:
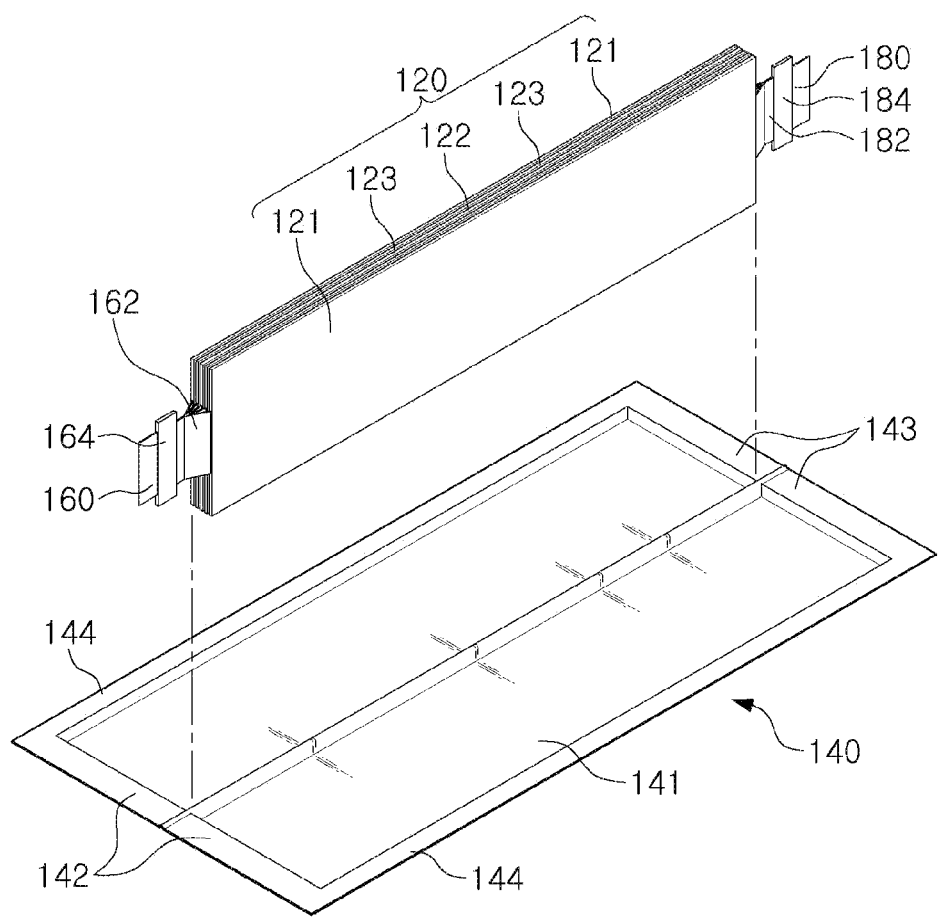
FIG. 3 is an exploded perspective view illustrating a pouch-type secondary battery according to an embodiment of the present disclosure.

FIG. 1 is a perspective view illustrating a pouch-type secondary battery according to an embodiment of the present disclosure, FIG. 2 is an enlarged view illustrating portion A of FIG. 1, and FIG. 3 is an exploded perspective view illustrating a pouch-type secondary battery according to an embodiment of the present disclosure.

Referring to FIGS. 1 to 3, a pouch-type secondary battery 100 may be configured to include, as an example, an electrode assembly 120, a pouch film 140, a negative electrode lead 160, and a positive electrode lead 180.

The electrode assembly 120 may be accommodated in an enclosure provided by the pouch film 140. As an example, the electrode assembly 120 may include a first electrode plate 121, a second electrode plate 122, and a separator 123, formed in a thin plate shape or a film shape, and may be formed in various forms as needed, such as a stack type, a wound type, or the like. For example, the first electrode plate 121 may serve as a negative electrode, and the second electrode plate 122 may serve as a positive electrode.

The first electrode plate 121 may be formed by, for example, coating a first electrode active material such as graphite, carbon, or the like on a first electrode current collector formed of a metal foil such as copper, a copper alloy, nickel, or a nickel alloy. In addition, the first electrode plate 121 may include a first electrode uncoated region (not illustrated) that may be a region in which the first electrode active material is not applied. The first electrode uncoated region may serve as a path for current flow between the first electrode plate 121 and an outside of the first electrode plate 121.

The second electrode plate 122 may be formed by, for example, coating a second electrode active material such as a transition metal oxide or the like on a second electrode current collector formed of a metal foil such as aluminum or an aluminum alloy. In addition, the second electrode plate 122 may include a second electrode uncoated region (not illustrated) that may be a region in which the second electrode active material is not applied. The second electrode uncoated region may also serve as a path for current flow between the second electrode plate 122 and an outside of the second electrode plate 122.

The separator 123 may be located between the first electrode plate 121 and the second electrode plate 122, to prevent a short circuit and to enable movement of lithium ions. For example, the separator 123 may be formed of polyethylene, polypropylene, or a composite film of polyethylene and polypropylene.

As an example, the first electrode plate 121, the second electrode plate 122, and the separator 123 may be arranged in a height direction of the pouch film 140.

The pouch film 140 may accommodate the electrode assembly 120 therein, and the negative electrode lead 160 and the positive electrode lead 180 may be arranged to protrude from both sides of the pouch film 140.

An accommodation portion 141 may be formed in the pouch film 140. In addition, a bottom surface of the accommodation portion 141 may be formed to be flat. In addition, the electrode assembly 120 may be inserted into the accommodation portion 141, and the pouch film 140 may be folded around one surface of the electrode assembly 120.

As illustrated in FIG. 1, the pouch film 140 may include a first side sealing portion 142, a second side sealing portion 143, and an upper sealing portion 144 which collectively enable formation of an enclosure in which the electrode assembly 120 is placed. In this case, in the pouch-type secondary battery 100, the electrode assembly 120 may be accommodated by overlapping the accommodation portion 141, the first and second side sealing portions 142 and 143, excluding the upper sealing portion 144, may be entirely bonded to each other, an electrolyte may be injected through a region in which the upper sealing portion 144 is disposed, and a sealing process may be then performed. In this manner, three (3) edges of the pouch-type secondary battery 100 may be sealed. For example, the upper sealing portion 144 may be folded toward the other surface of the electrode assembly 120 to maintain a strong bonding state.

The electrolyte may be formed by adding a lithium salt such as LiPF6, LiBF4, or the like in an organic solvent such as ethylene carbonate (EC), propylene carbonate (PC), diethyl carbonate (DEC), ethylmethyl carbonate (EMC), dimethyl carbonate (DMC), or the like. In addition, the electrolyte may be in a liquid phase or a gel phase.

Also, the pouch film 140 may be formed as a laminate sheet including a metal layer and a resin layer. In particular, the laminate sheet may be an aluminum laminate sheet. As an example, the pouch film 140 may include a core portion formed of a metal layer as a material, a heat-fused layer formed on an upper surface of the core portion, and an insulating film formed on a lower surface of the core portion.

The heat-fused layer may use a polymer resin, such as modified polypropylene, for example, cast polypropylene (CPP) to act as an adhesive layer, and the insulating film may be formed of a resin material such as nylon or polyethylene terephthalate (PET), but a structure and a material of the pouch film are not limited.

Furthermore, as illustrated in FIG. 2, the pouch film 140 may include a folded portion 146 that may be folded toward a bottom surface 145. The folded portion 146 may be folded in one direction. In more detail, both end portions of the pouch film 140 may be bonded to each other to form the first side sealing portion 142 and the second side sealing portion 143. In this case, the folded portion 146 may be disposed to protrude in an outward direction, based on and compared to the bottom portion 145. Thereafter, when sealing of the upper sealing portion 144 is completed, the folded portion 146 protruding from the bottom portion 145 may be folded toward the bottom portion 145. In this case, the folded portion 146 may be folded by, for example, rolling of a circular roller (not illustrated) in a state in which the pouch-type secondary battery 100 is fixed to a jig (not illustrated). The circular roller may be rolled in a state inclined at a predetermined angle to press the folded portion 146. Therefore, the folded portion 146 may be folded in an upward direction or a downward direction. A pressed portion 146a having a shape folded by rolling of a roller or the like may be provided on an end of the folded portion 146. The pressed portion 146a may be a portion formed by rolling of a roller or the like, and may be formed only on the end of the folded portion 146 when the folded portion 146 is formed. In this case, a case in which the pressed portion 146a has a folded shape is illustrated, but the present disclosure is not limited thereto. The pressed portion 146a may have a shape that may be distorted or curved in one direction or a plurality of directions. In addition, the folded shape may be a concept including a distorted shape or a curved shape.

The negative electrode lead 160 may be electrically connected to the first electrode uncoated portion (not illustrated) of the first electrode plate 121, and one end portion of the negative electrode lead 160 may be disposed to protrude from the pouch film 140. As an example, the negative electrode lead 160 may be formed of copper, a copper alloy, nickel, or a nickel alloy material, which may be the same material as that of the first electrode plate 121. The negative electrode lead 160 may be connected to the first electrode plate 121 through a current collector 162. In addition, the negative electrode lead 160 and the current collector may be bonded by welding. As an example, a sealing film 164 formed of an insulating film or the like may be installed on the negative electrode lead 160, and the sealing film may be disposed in the first side sealing portion 142.

The positive electrode lead 180 may be electrically connected to the second electrode uncoated portion (not illustrated) of the second electrode plate 122, and one end portion of the positive electrode lead 180 may be disposed to protrude from the pouch film 140. As an example, the positive electrode lead 180 may be formed of aluminum or an aluminum alloy material, which may be the same material as that of the second electrode plate 122. Also, the positive electrode lead 180 may be connected to the second electrode plate 122 through a current collector 182. The positive electrode lead 180 and the current collector may be bonded by welding. As an example, a sealing film 184 formed of an insulating film or the like may be installed on the positive electrode lead 180, and the sealing film may be disposed in the second side sealing portion 143.

Figure 5:
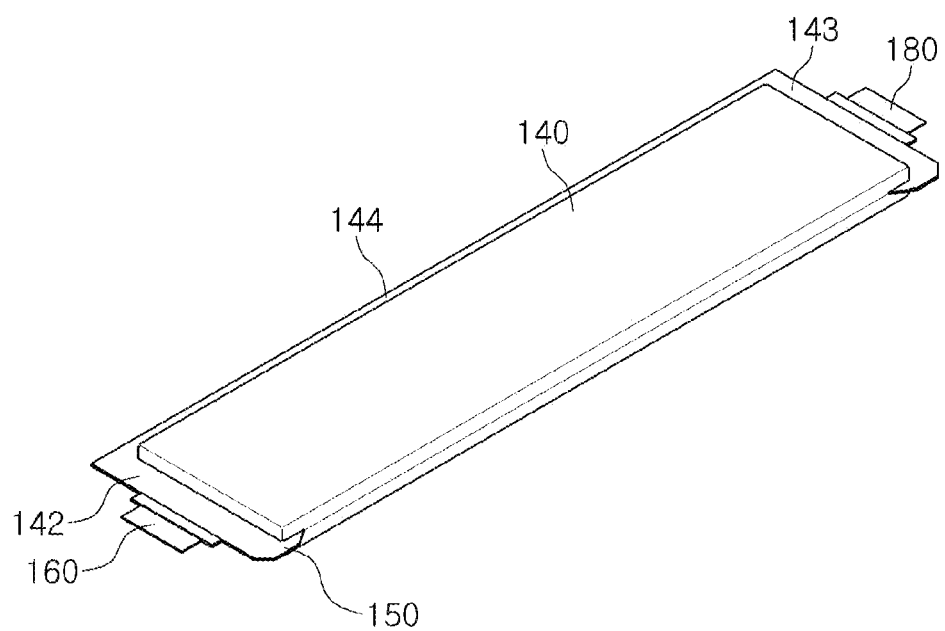

As described above, the folded portion 146 may be formed in the pouch film 140, to remove a protrusion (e.g., a shark-fin, a bat ear, or the like) arranged to protrude from the bottom portion surface 145 of the pouch film 140, or to reduce a height of the protrusion 150 (see FIG. 5).

Hereinafter, a method of manufacturing a pouch-type secondary battery 100 according to an embodiment of the present disclosure will be described with reference to the drawings.

FIGS. 4 to 7 are process diagrams illustrating a method of manufacturing a pouch-type secondary battery 100 according to an embodiment of the present disclosure.

Figure 4:
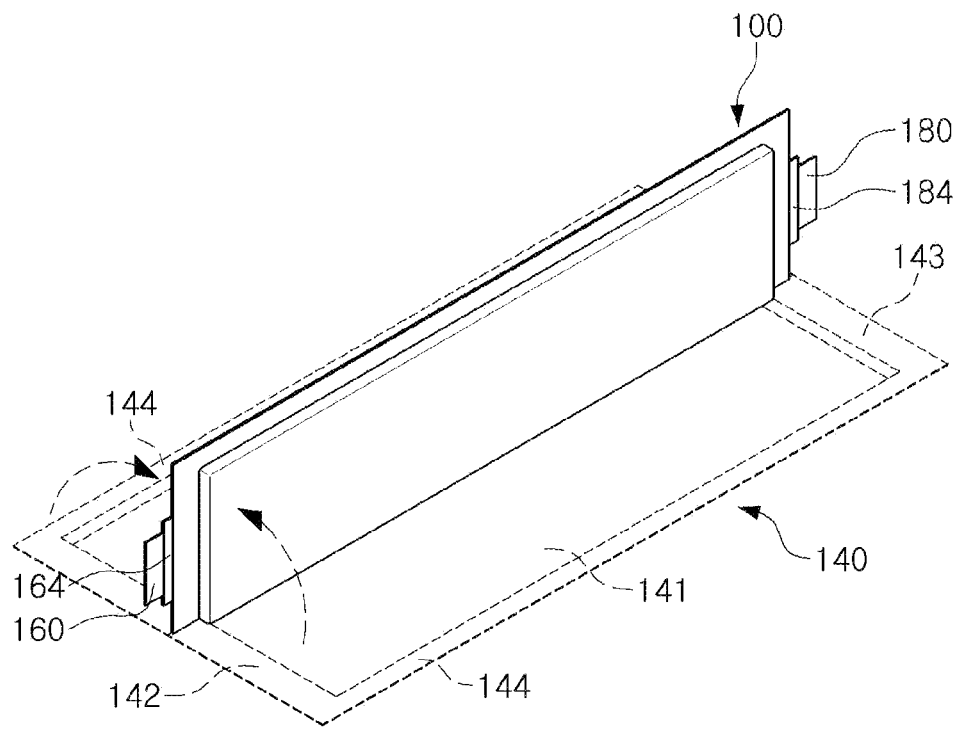
FIGS. 4 to 7 are process diagrams illustrating a method of manufacturing a pouch-type secondary battery 100 according to an embodiment of the present disclosure.

First, as illustrated in FIG. 4, an electrode assembly 120 having a negative electrode lead 160 and a positive electrode lead 180 installed in both end portions may be inserted and disposed in an accommodation portion 141 of a pouch film 140. Thereafter, the electrode assembly 120 may be accommodated in the pouch film 140 by folding the pouch film 140 around a bottom portion 145 (refer to FIG. 2) disposed in a central portion of the accommodation portion 141.

Thereafter, as illustrated in FIG. 5, after forming a first side sealing portion 142 and a second side sealing portion 143 of the pouch film 140, an upper sealing portion 144 of the pouch film 140 may be finally formed. In this case, as illustrated in FIG. 5, a protrusion 150 disposed to protrude from the bottom portion 145 may be formed in both end portions of the first side sealing portion 142 and the second side sealing portion 143, connected to the bottom portion 145 of the pouch film 140.

Figure 6:
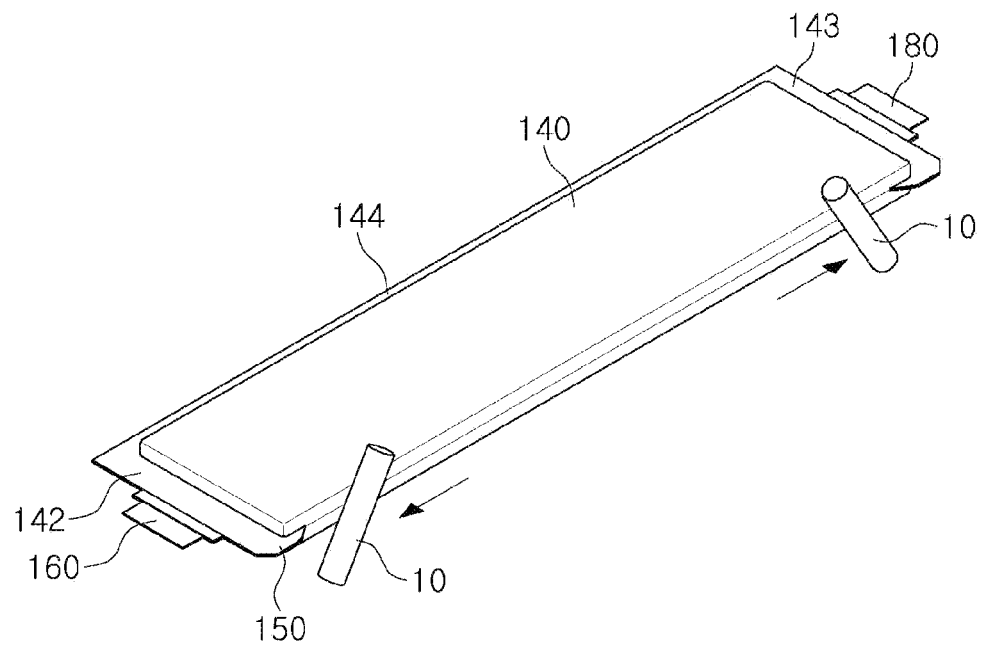
Figure 7:
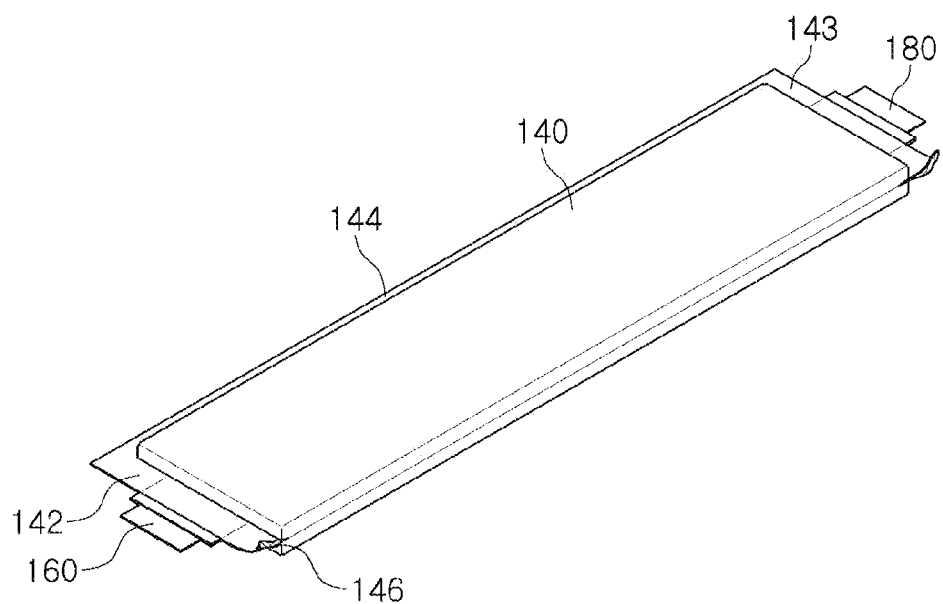

Thereafter, as illustrated in FIG. 6, the protrusion 150 may be formed into a folded portion 146 by pressing the protrusion 150 through rolling of a roller 10 inclinedly disposed. Therefore, as illustrated in FIG. 7, the folded portion 146 may be folded toward an upper side of the bottom portion 145 as an example. A pressed portion 146a having a shape folded by the rolling of the roller may be provided on an end of the folded portion 146. The pressed portion 146a may be a portion formed by the rolling of the roller, and may be formed only at the end of the folded portion 146 when the folded portion 146 is formed.

As described above, since the folded portion 146 may be formed by the rolling of the roller 10 inclinedly disposed, a degree of damage to the pouch film 140 may be reduced. For example, when the roller 10 is vertically disposed on the bottom portion 145 and the protrusion is pressed by rolling by the roller 10, the protrusion may be entirely distorted and a region in which the protrusion is formed may be torn, or a height of the protrusion may increase, compared to the folded portion 146. In the present embodiment, since the protrusion 150 may be pressed through the rolling of the roller 10 inclinedly disposed, a direction in which the protrusion 150 is folded may constantly flow. Therefore, a shark-fin, which may be the protrusion 150, may be removed from the pouch-type secondary battery 100, or a height of the shark-fin, which may be the protrusion 150, may be reduced.

As described above, since the folded portion 146 may be formed by the rolling of the roller 10, the protrusion 150 may be removed, but a height of the protrusion 150 may be reduced, and furthermore, when the folded portion 146 is formed, damage to the pouch film 140 may be prevented.

Furthermore, since the pouch-type secondary battery 100 may be in surface contact with a case (not illustrated) or the like, cooling efficiency may be improved. In addition, when a pouch-type secondary battery module or a pouch-type secondary battery pack is manufactured, the protrusion 150 provided in the pouch-type secondary battery 100 may be removed or a height of the protrusion 150 may be reduced. Therefore, a volume density of the pouch-type secondary battery module or the pouch-type secondary battery pack may be improved.

Hereinafter, a pouch-type secondary battery and a method for manufacturing the same according to another embodiment of the present disclosure will be described with reference to the drawings.

Figure 8:
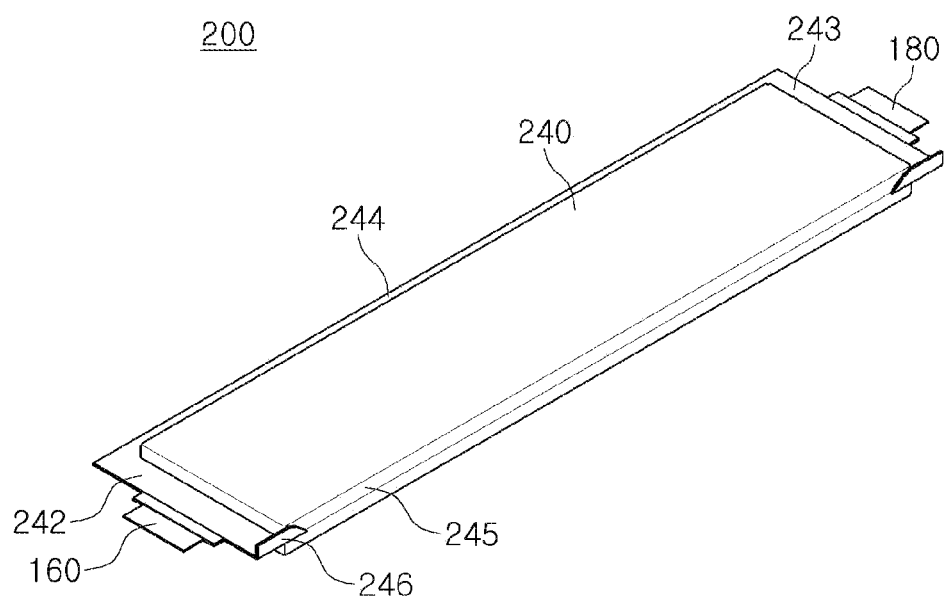
FIG. 8 is a schematic perspective view illustrating a pouch-type secondary battery according to another embodiment of the present disclosure.

FIG. 8 is a schematic perspective view illustrating a pouch-type secondary battery according to another embodiment of the present disclosure.

Referring to FIG. 8, a pouch-type secondary battery 200 according to another embodiment of the present disclosure may be configured to include, as an example, an electrode assembly 120, a pouch film 240, a negative electrode lead 160, and a positive electrode lead 180.

Since the electrode assembly 120, the negative electrode lead 160, and the positive electrode lead 180 may be substantially the same as the configuration provided in the pouch-type secondary battery 100 according to an embodiment of the present disclosure, described above, detailed descriptions thereof will be omitted.

The pouch film 240 may accommodate the electrode assembly 120 therein, and the negative electrode lead 160 and the negative electrode lead 180 may protrude from both sides of the pouch film 240. Except for a folded portion 246 to be described below, the pouch film 240 may be substantially the same as the configuration provided in the pouch film 140 of the pouch-type secondary battery 100 according to the embodiment of the present disclosure, described above. Therefore, detailed descriptions thereof will be omitted and will be replaced with the above description.

As illustrated in FIG. 8, the pouch film 240 may include the folded portion 246 that may be folded toward a bottom portion 245. In more detail, both end portions of the pouch film 240 may be bonded to each other to form a first side sealing portion 242 and a second side sealing portion 243. In this case, the folded portion 246 may be disposed to protrude, based on and compared to the bottom portion 245. Thereafter, when sealing of an upper sealing portion 244 is completed, the folded portion 246 protruding from the bottom portion 245 may be folded toward the bottom portion 245. In this case, the folded portion 246 may be folded by rotating the pouch-type secondary battery 200 to contact the bottom portion 245 with a floor, in a state in which an upper surface or a bottom surface of the pouch-type secondary battery 200 is in contact with the floor. In this case, the folded portion 246 may be folded by a folding knife 20 (refer to FIGS. 9 and 10). Therefore, the folded portion 246 may be folded in an upward direction or a downward direction. In addition, when the folded portion 246 is formed, a process of heating or cooling the protrusion 150 (refer to FIG. 5) may be included. Therefore, it is possible to prevent the folded portion 246 from returning to its original shape due to a spring back phenomenon of the folded portion 246. For example, when the folded portion 246 is formed, the protrusion may be heated or cooled to be thermally deformed in a folded region of the folded portion 246, and then the folded portion 246 may be formed. Thereafter, the heating or cooling may be stopped to maintain a state in which the thermal deformation is performed, it is possible to prevent the folded portion 246 from returning to its original shape due to a spring back phenomenon of the folded portion 246.

The folding knife 20 (refer to FIGS. 9 and 10) may have a flat plate shape. In addition, the folding knife may have a length, longer than a length of the bottom portion 245 of the pouch film 240, and may have a width, less than a thickness of the bottom portion 245. Therefore, the folded portion 246 may be formed to be in close contact with the bottom portion 245. Therefore, a portion of the folded portion 246 to be folded may have a straight shape.

Figure 9:
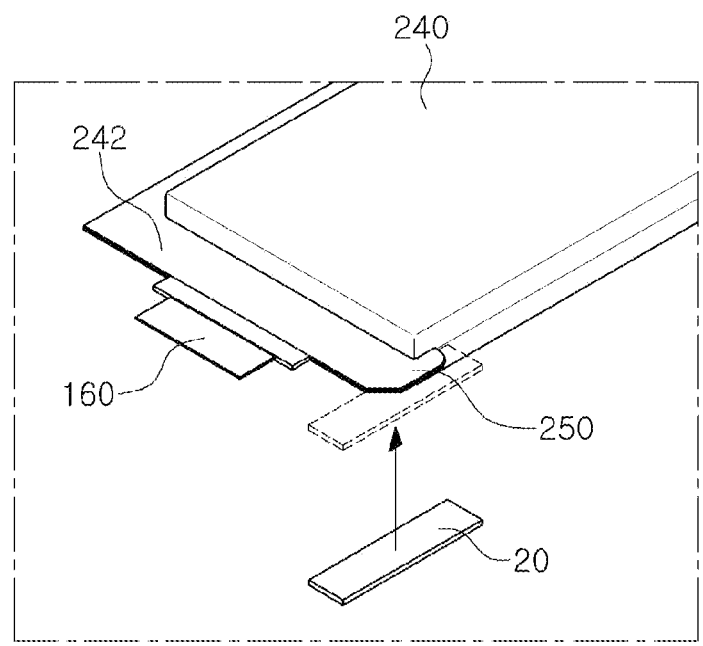
FIGS. 9 and 10 are process diagrams illustrating a method of manufacturing a pouch-type secondary battery according to another embodiment of the present disclosure.
Figure 10:
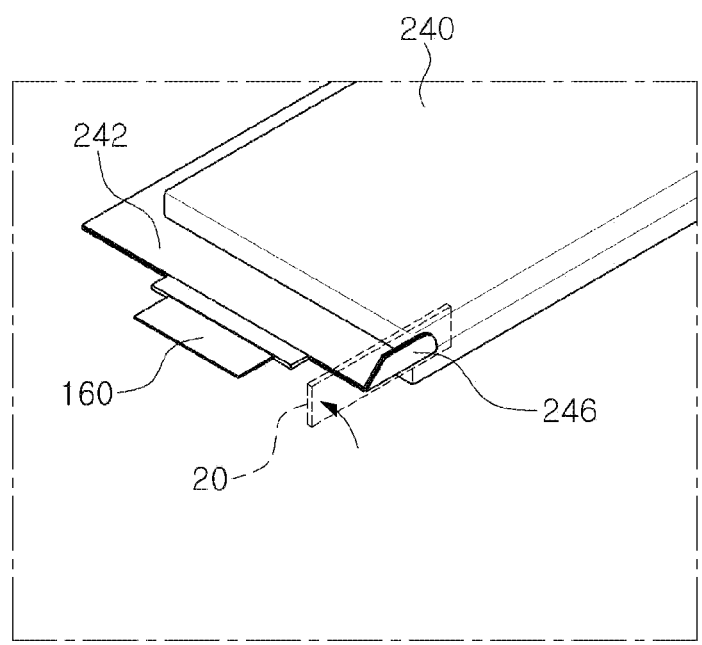

FIGS. 9 and 10 are process diagrams illustrating a method of manufacturing a pouch-type secondary battery according to another embodiment of the present disclosure.

The operations illustrated in FIGS. 4 and 5 in the method for manufacturing a pouch-type secondary battery according to an embodiment of the present disclosure may be substantially the same as operations provided in a method for manufacturing a pouch-type secondary battery according to another embodiment of the present disclosure. Therefore, detailed descriptions thereof will be omitted and will be replaced with the above description.

As illustrated in FIG. 9, a protrusion 250 may be folded by a folding knife 20 to form a folded portion 246 illustrated in FIG. 9. Therefore, as illustrated in FIG. 10, the folded portion 246 may be folded toward an upper side of a bottom portion 245, as an example. Since the folded portion 246 may be formed by a plate-shaped folding knife 20, a portion at which the folded portion 246 is folded may have a straight shape. In addition, when the folded portion 246 is formed, the folded portion 246 may be heated or cooled. Therefore, it is possible to prevent the folded portion 246 from returning to its original shape due to a spring back phenomenon of the folded portion 246. For example, when the folded portion 246 is formed, the protrusion may be heated or cooled to be thermally deformed in a folded region of the folded portion 246, and then the folded portion 246 may be formed. Thereafter, the heating or cooling may be stopped to maintain a state in which the thermal deformation is performed, it is possible to prevent the folded portion 246 from returning to its original shape due to a spring back phenomenon of the folded portion 246.

As described above, since the folded portion 246 may be formed by the plate-shaped folding knife 20, a degree of damage to the pouch film 240 may be reduced. For example, since the folded portion 246 may be formed without rolling of a roller 10 (refer to FIG. 6), it is possible to prevent the folded portion 246 from being distorted. Therefore, it is possible to prevent damage caused by the distortion of the pouch film 240. In addition, since a folded portion of the folded portion 246 may be formed to have a straight shape, a shark-fin, which may be the protrusion 250, may be removed from the pouch-type secondary battery 200, or a height of the shark-fin, which may be the protrusion 250, may be reduced.

Figure 11:
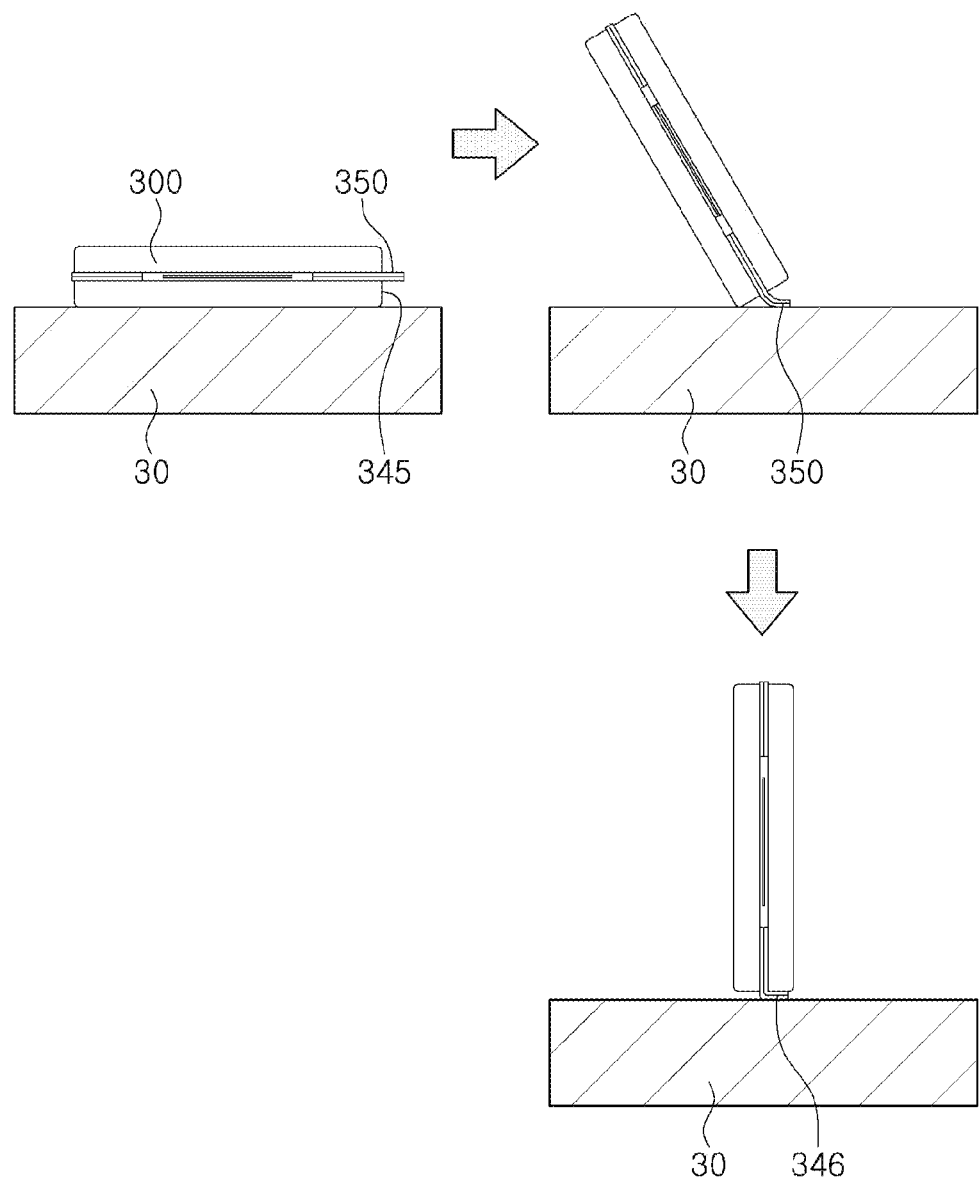
FIG. 11 is a process diagram illustrating a method of manufacturing a pouch-type secondary battery according to another embodiment of the present disclosure.

FIG. 11 is a process diagram illustrating a method of manufacturing a pouch-type secondary battery according to another embodiment of the present disclosure.

The operations illustrated in FIGS. 4 and 5 in the method for manufacturing a pouch-type secondary battery according to an embodiment of the present disclosure may be substantially the same as operations provided in a method for manufacturing a pouch-type secondary battery according to another embodiment of the present disclosure. Therefore, detailed descriptions thereof will be omitted and will be replaced with the above description.

Referring to FIG. 11, a pouch-type secondary battery 300 in which a protrusion 350 is formed may be disposed in a laid state on a folded portion forming plate 30. Thereafter, in a state in which the folded portion forming plate 30 is heated or cooled, the pouch-type secondary battery 300 may be erected to contact a bottom portion 345 of the pouch-type secondary battery 300 with the folded portion forming plate 30. Therefore, the protrusion 350 may be folded to form a folded portion 346.

Therefore, it is possible to prevent the folded portion 346 from returning to its original shape due to a spring back phenomenon of the folded portion 346. For example, when the folded portion 346 is formed, the protrusion may be heated or cooled to be thermally deformed in a folded region of the folded portion 346, and then the folded portion 346 may be formed. Thereafter, the heating or cooling may be stopped to maintain a state in which the thermal deformation is performed, it is possible to prevent the folded portion 346 from returning to its original shape due to a spring back phenomenon of the folded portion 346.

As described above, since the folded portion 346 may be formed on the folded portion forming plate 30 having a plate shape, a degree of damage to a pouch film 340 may be reduced. For example, since the folded portion 346 may be formed without rolling of a roller 10 (see FIG. 6), it is possible to prevent the folded portion 346 from being distorted. Therefore, it is possible to prevent damage caused by the distortion of the pouch film 340. In addition, since a folded portion of the folded portion 346 may be formed to have a straight shape, a shark-fin, which may be the protrusion 350, may be removed from the pouch-type secondary battery 300, or a height of the shark-fin, which may be the protrusion 350, may be reduced.

According to an embodiment of the present disclosure, an effect in which a protrusion is removed or a height thereof is reduced may be provided.

In addition, according to an embodiment of the present disclosure, effects improving a bulk density and increasing cooling efficiency may be provided.

While example embodiments have been illustrated and described above, variations and improvements of the disclosed embodiments and other embodiments may be made based on what is disclosed.

What is claimed is:

1. A pouch-type secondary battery comprising:
   an electrode assembly including a first electrode plate, a second electrode plate, and a separator disposed between the first electrode plate and the second electrode plate; and
   a pouch film structured to accommodate the electrode assembly and including a first side sealing portion, a second side sealing portion, an upper sealing portion including end portions connected to the first and second side sealing portions, and a folded portion disposed on an end of the first side sealing portion and an end of the second side sealing portion,
   wherein a negative electrode lead connected to the electrode assembly protrudes from the first side sealing portion, and a positive electrode lead connected to the electrode assembly protrudes from the second side sealing portion, and
   wherein the folded portion is folded in one direction toward a bottom portion of the pouch film,
   wherein the folded portion comprises a pressed portion including an end having a folded shape and connected to the bottom portion of the pouch film.

2. The pouch-type secondary battery of claim 1, wherein the upper sealing portion, the first side sealing portion and the second side sealing portion of the pouch film are located on three sides of the pouch film.

3. The pouch-type secondary battery of claim 1, wherein the folded portion includes a first portion to be folded, wherein the first portion has a straight shape.

4. The pouch-type secondary battery of claim 1, wherein the pouch film is folded to overlap on both sides based on one side surface of the electrode assembly, and a portion of the pouch film in contact with the one side surface of the electrode assembly forms the bottom portion of the pouch film.

5. The pouch-type secondary battery of claim 1, wherein the folded portion includes a first portion to be folded, wherein the first portion is disposed in a central portion of the bottom portion of the pouch film.

\* \* \* \* \*